United States Patent Office 3,455,410
Patented July 15, 1969

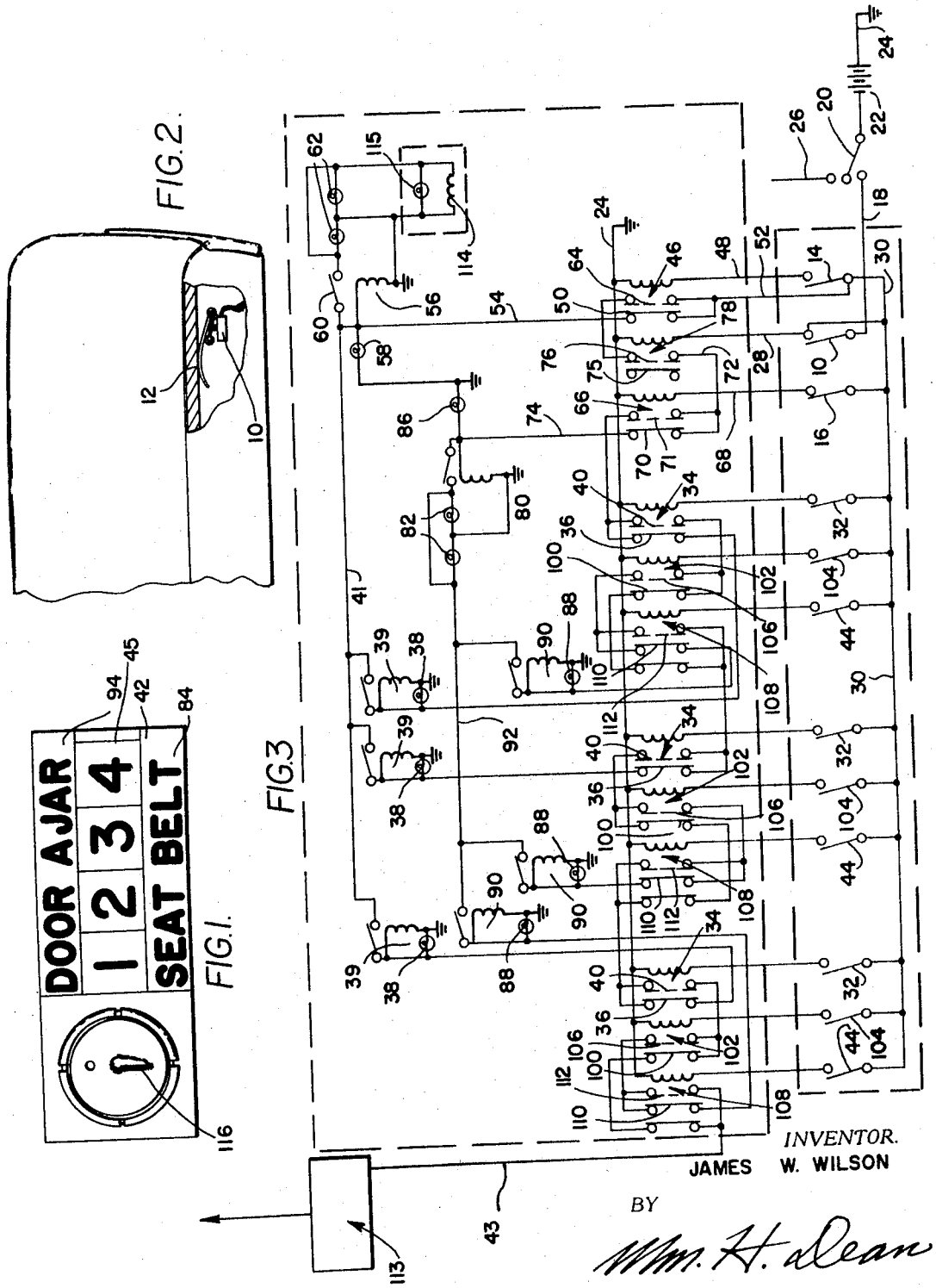

3,455,410
PASSENGER SAFETY SYSTEM FOR AUTOMOBILES
James W. Wilson, 1014 E. Northview,
Phoenix, Ariz. 85020
Filed Apr. 27, 1967, Ser. No. 634,262
Int. Cl. B60k 27/08, 33/00
U.S. Cl. 180—82                              5 Claims

ABSTRACT OF THE DISCLOSURE

A passenger safety system for automobiles wherein door operated switches, seat operated switches, and safety strap operated switches are disposed to control the ignition system of an automobile, said switches being so disposed in an automobile that each seat operated switch energizes a door operated switch and a safety belt operated switch to insure the closed condition of the automobile doors, and the fastening of seat belts before the automobile engine ignition system may be activated.

This invention relates to a passenger safety system for automobiles and more particularly to a safety system wherein door operated switches, seat operated switches, and safety strap operated switches are utilized in series to control operation of the automobile engine ignition system.

Background of the invention

Various electrical systems have been used in automobiles to insure the closing of seat belt operated switches or the like, before the ignition system of the automobile may be operated. However, such systems have required either master switches or special attention to the seat belt operated switches when some of the seats in the automobile are unoccupied and when some of the respective seat belt switches are unattended. In accordance with the operation of such prior art systems, in many instances it has been necessary for the driver of the automobile, when alone, to connect all of the seat belt switches in order to make the respective safety system operable.

Summary of the invention

Accordingly, it is an object of the present invention to provide a novel driver and passenger safety system for automobiles, wherein a group of switches is provided for each passenger in the automobile, each group of switches comprising a door operated switch, a seat operated switch, and a seat belt or safety strap operated switch so that each respective passenger must fasten his seat belt and securely close his door, and actuate the seat operated switch by occupancy of the respective seat before the ignition system of the automobile can be operated.

Another object of the invention is to provide a passenger safety system for automobiles wherein each passenger of the automobile is provided with a group of switches including a seat operated switch, a door operated switch, and a seat belt or safety strap operated switch, and wherein the seat operated switch is operable by deflection of the seat under the weight of the passenger and this switch operates and controls the other switches of each respective group so that each seat belt operated switch need not be closed when the respective seat operated switch is open thereby relieving the operator of the vehicle from the task of closing each seat belt switch in passenger seats which are unoccupied.

Another object of the invention is to provide a passenger safety system for automobiles, in which each passenger is provided with a group of safety switches including a door operated switch, a seat operated switch, and a seat belt or a safety strap operated switch; said switches all disposed in series to cooperate with indicator means, such as lights or the like, disposed in position to be observed by the driver of the automobile, and such that said warning lights or indicators are inoperative when all of the respective door operated switches, seat operated switches, and seat belt operated switches are properly closed to insure the safety of the respective passengers.

Another object of the invention is to provide a passenger safety system for automobiles comprising a group of switches for each passenger comprising a door operated switch, a seat operated switch, and a seat belt operated switch, coupled to an indicator means in position to be observed by the driver of the automobile; said indicator means indicating the particular seats and the particular door or seat belt switches which have not been closed so that the operator may at all times, be aware of any and all unsafe conditions with respect to a particular passenger and his respective seat belt operated switch and door operated switch.

Another object of the invention is to provide a passenger safety system for automobiles, in accordance with the foregoing objects wherein the ignition system of an automobile may automatically be rendered inoperative in the event a door operated switch or a seat operated switch is not closed in circuit with a respective passenger's seat operated switch.

Another object of the invention is to provide a passenger safety system for automobiles wherein door, seat, and seat belt safety switches are utilized to prevent operation of an automobile ignition system or to interrupt it in case the switches are not in proper closed position, and wherein a time delay means is provided for continuing energization of the ignition switch for a short period of time after which one of the seat belt operated switches or the door operated switches may open so that the operator of the vehicle has sufficient time to pull to a stop and correct the unsafe condition of the respective switch.

Brief description of the drawings

FIG. 1 is a front elevational view of an indicator panel of the passenger safety system for automobiles in accordance with the present invention;

FIG. 2 is a fragmentary front elevational view of an automobile seat, showing portions thereof broken away and in section, and illustrating a seat operated switch in said seat and adapted to be operated when the weight of a passenger is placed over the area of the respective seat operated switch; and FIG. 3 is diagrammatic view of the electrical equipment of the present invention.

Description of the preferred embodiments

As shown in FIG. 2 of the drawings, the present invention comprises a seat operated switch 10, to be located beneath each of the passenger seats in an automobile. For the purpose of the present disclosure, four seats are considered, and four such switches 10 are diagrammatically illustrated.

The switch 10 shown in FIG. 2 is provided with a lever 12, responsive to downward pressure of the seat cushion for closing the switch 10, which as shown in FIG. 3 is the driver's seat operated switch in circuit with a respective door operated switch 14 and a seat belt or safety strap operated switch 16. These switches 10, 14 and 16, constitute a group of switches designated GROUP 1, and are related to the seat normally occupied by the driver, as well as his seat belt or body supporting safety strap operated switch, and to the door operated switch installed to be operated by the door adjacent the driver.

Attention is directed to the designations GROUP 2, GROUP 3, and GROUP 4, which identify groups of switches disposed to serve other passengers of an automobile, these groups of switches are similar to the switches 10, 14 and 16, as will be hereinafter described.

The switch 10 is coupled by a conductor 18 through a switch 20, to a positive side of a battery 22, serving as a power source, and having a ground connection 24. The switch 20 may be a key operated switch and may be alternately coupled to energize the conductor 18 or another conductor 26 which may serve directly the automobile ignition system when any components of the present invention are out of order, and also when the automobile engine needs to be operated for maintenance on tune-up purposes.

The driver's seat operated switch 10 whe closed, energizes conductors 28 and 30. The conductor 30 energizes the switches 14 and 16, and all of the similar switches of GROUPS 2, 3, and 4. In the event that the vehicle is occupied only by the driver, the switch 10 is closed when the driver sits in the driver's seat. When the driver fastens his seat belt, or his safety strap, a suitable switch mechanism thereon, closes the switch 16, and when the door adjacent the driver is securely closed, the switch 14 is closed.

In the event that any of the other door operated switches 32, of GROUPS 2, 3, or 4, are open, the respective relays 34 are such that their bridge contacts 36 energize respective indicator lamps 38 which are disposed behind the central section 45 of the operator's instrument panel 42. These lights 38 illuminate the respective numbers 2, 3, and 4 as the case may be, until the respective doors are closed in order to close the respective door operated switches 32. When the respective switches 32 are all closed, all of the relays 34 are energized and the bridge contacts 36 are moved to a broken line position 40 to establish ignition circuit continuity to a conductor 43 which may then energize the automobile ignition system assuming that all of the switches 10, 14, and 16 and 32 are closed. Under this condition a lone automobile driver may operate the respective automobile without closing respective seat belt operated switches 44 of GROUPS 2, 3, and 4.

It will be seen that the driver's seat operated switch 10, when closed, energizes switches 14, and 16 through the conductor 30. The door operated switch 14 being adjacent to the driver, is operated by the driver's door, and is normally closed when the driver's door is closed. However, should the driver's door be ajar, a relay 46, coupled to the switch 14 by a conductor 48, will not be energized and accordingly a bridge contact 50, of the relay 46, will establish a circuit through a conductor 52 and another conductor 54, with a relay 56 and an indicator light 58. The indicator light 58 is disposed behind numeral 1 on the panel 42, and the relay 56 energizes a switch 60 and thus also energizes a pair of lamps 62 disposed behind the DOOR AJAR designation 94 on the panel 42.

When the switch 14 is closed by closing the automobile door, the bridge contact 50 moves to a broken line position of the relay 46 as indicated at 64, breaking the circuit to the lamps 58 and 62, however, should the belt or safety strap operated switch 16 remain open, the driver of the automobile must close this switch 16 before completing circuitry to the conductor 43 as will be hereinafter described.

When the switch 16 remains open before the operator seat belt or safety strap has been fastened, a relay 66 energizable through a conductor 68 in connection with the switch 16, is not energized and a bridge contact 70 of the relay 66 couples a conductor 72 with a conductor 74. The conductor 72 has been previously energized through a bridge contact 75 moved to a broken line position 76 by the respective relay 78 already energized by the seat operated switch below the seat occupied by the driver. Thus when the switch 16 is open, the conductor 74 energizes a relay 80 operating a pair of indicator lights 82 located behind a control panel section designated 84, indicating SEAT BELT on the control panel or instrument panel 42 disposed in view of the driver. Additionally, a lamp 86 will also be energized behind the number 1 designation so that the driver will know that number 1 seat belt is not fastened.

Additional seat belt indicator lights 88 are in circuit with the switches of GROUPS 2, 3 and 4, these lights 88 are also energized in connection with respective relays 90 which also energize a conductor 92 and thereby independently energize the lamp 82 behind the SEAT BELT designation so that should any one of the seat belts be uncoupled, the lamp 82 will be energized as well as one of the respective lamps 88 located behind any one of the indicator numerals 2, 3 or 4 of the panel section 40. Thus the driver of the vehicle may know immediately whether a particular seat belt occupied by a given passenger, has not been fastened, and also the lamps 38 hereinbefore described, are concurrently energizable with the relays 39, which energize a conductor 41, which also energizes the respective relay 56 and the door ajar lamps 62 which are located behind the door ajar section 94 of the indicator panel 42.

It will be seen that when the switches 10, 14 and 16 are all closed, that electrical energy may pass from the conductor 18 through the switch 10, conductor 30, switch 14, conductor 52 and bridge contact 50 in the broken line position 64, then through the bridge contact 75 in the broken line position 76, then through the bridge contact 70 in the broken line position 71, then through the respective bridge contacts 36 in their broken line positions 40, then through bridge contacts 100 of seat switch operated relays 102 of the respective seat operated switches 104 of the GROUPS 2, 3 and 4.

When the seat operated switches 104 of the GROUPS 2, 3, and 4 are closed, the respective relays 102 move their contacts 100 to broken line position 106 and thus then make it mandatory that the respective seat belt or safety strap operated switches 44 are closed in order to complete a circuit to the ignition energizing conductor 43 so that the automobile may be operated.

From the foregoing it will be obvious to those skilled in the art that when the passenger seats are not occupied with respect to the groups of switches 2, 3, and 4, the driver occupying the seat with respect to GROUP No. 1, does not need to close the seat belt or belt safety strap operated switches 44. These switches 44 each operate a relay 108. Each relay 108 is provided with a bridge contact 110 through which a respective seat belt indicator lamp 88 may be energized when the respective switch 44 is open, and when the respective bridge contacts 110 is moved to a broken line position 112 by energization of the relay 108 through the closing of the respective switch 44, the respective indicator lamp 88 is de-energized.

It will be seen that the invention is provided with an automobile brake energizing relay 114, which may be energized together with an emergency light flasher 115 through either the conductor 41 or the conductor 54 in the event any of the door operated switches 14 or 32 remain open. This brake energizing means 114 may be optional, however, it may be utilized to prevent movement of the automobile or to apply the brakes to any degree desired in the event a door of the automobile inadvertently comes open, and causes a respective switch 14 or 32, to open. When such happens the respective relay 46 or 34 will be de-energized causing the energization of the respective door ajar indicator lights or lamps 38, 58, and 62.

A time delay relay 113 is coupled to the conductor 43 to maintain energiaztion of an automobile ignition system for a short period of time after energy to the conductor 43 is interrupted. It will be apparent to those skilled in the art that the relay 113 thus conducts energy to the automobile engine ignition system from a source which is separate from the battery 22 when energy to the conductor 43 is interrupted.

In connection with, the indicator panel 42, the automobile ignition switch, designated 116 in FIG. 1, may be in adjacent relationship with or connected to the panel 42, and disposed in plain view of the driver of the vehicle.

It will be understood that the equipment of the invention may be provided with solid state circuitry including various semiconductors or the like as desired.

It will be obvious to those skilled in the art, that various modifications of the present invention may be resorted to without departing from the spirit of the invention.

I claim:

1. In a passenger safety system for automobiles, the combination of: a power source; a first conductor adapted to deliver power to an automobile engine ignition system; a seat operated switch adapted to be operated by deflection of an automobile seat; a safety strap switch adapted to be operated by fasteners of a body holding safety strap; both of said switches in circuit with each other for conducting energy from said power source to said first conductor; a safety strap indicator adapted to be placed in the operator's compartment of an automobile; a first relay coupled to said indicator, said safety strap switch being coupled to said first relay to supply power to said first relay; a second conductor adapted to supply power to said safety strap switch; said seat operated switch, when closed, disposed to conduct energy from said power source to said first safety strap switch, whereby closing of said safety strap switch operates said first relay to an open position to de-energize said safety strap indicator; a door switch indicator being adapted to be placed in the operator's compartment of a vehicle; a second relay coupled to said door switch indicator, said door operated switch being coupled to said second relay to supply power to said second relay; a third conductor adapted to supply power to said door operated switch; said seat operated switch, when closed, disposed to conduct energy to said door operated switch from said power source whereby closing of said door operated switch operates said second relay to open position to de-energize said door switch indicator.

2. The invention, as defined in claim 1, wherein; said switches and relays compose one automobile passenger safety group and wherein a plurality of said groups are disposed in circuit with each other such that the relays of the groups in which the seat operated switch is not actuated are disposed in series circuits with said switches of a driver's seat group to maintain circuit continuity between said power source and said first conductor.

3. The invention, as defined in claim 2, wherein; one of said seat operated switches being adapted to be located in a driver's seat; and third conductor means adapted to be energized through said last mentioned one of said seat operated switches; said third conductor coupled to all the switches of said groups to supply energy thereto from said power source.

4. In a passenger safety system for automobiles, the combination of: a first power source; a first conductor in circuit with said first power source; a time delay means coupled to said power source and adapted to deliver power to an automobile engine ignition system after energy from said first source to said time delay means has been interrupted; a seat operated switch adapted to be operated by deflection of an automobile seat and in series with said power source; a safety strap switch operated by fasteners of a body holding safety strap; a relay operable by said safety strap switch; both of said switches being serially connected and in circuit with each other and said relay, said relay adapted to conduct energy from said power source through said seat operated switch to said time delay means, said time delay means being automatically operable and coupled to and disposed to energize said ignition system for a short period of time after one of said switches is open, said time delay means electrically operable automatically and in circuit with said safety strap switch automatically to delay interrupting operation of said automobile engine ignition system; and driver warning means disposed in circuit with said safety strap switch and said time delay means to warn the driver of impending interruption of the ignition system of said engine when said safety strap switches is opened.

5. In a passenger safety system for automobiles, the combination of: a power source; a first conductor adapted to deliver power to an automobile engine ignition system; a seat operated switch adapted to be operated by deflection of an automobile seat; a safety strap switch adapted to be operated by fasteners of a body holding safety strap; both of said switches in circuit with each other for conducting energy from said power source to said first conductor; brake applying means in circuit with said switches; a relay coupled to said brake applying means and said switches, said relay disposed to be energized by said switches and disposed to energize said brake applying means when one of said switches is open.

References Cited

UNITED STATES PATENTS 2,876,856 3/1959 Greene _____ 180—111
3,226,674 12/1965 Eriksson.
3,340,523 9/1967 Whitman.

A. HARRY LEVY, Primary Examiner

U.S. Cl. X.R.

180—101, 102, 111, 112; 340—52, 69, 278